United States Patent
Senba

(10) Patent No.: US 7,933,173 B2
(45) Date of Patent: Apr. 26, 2011

(54) WOBBLE SIGNAL EXTRACTION CIRCUIT AND OPTICAL DISK DEVICE

(75) Inventor: Kimimasa Senba, Kanagawa (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 12/333,934

(22) Filed: Dec. 12, 2008

(65) Prior Publication Data

US 2009/0154305 A1   Jun. 18, 2009

(30) Foreign Application Priority Data

Dec. 13, 2007   (JP) .................. 2007-322460

(51) Int. Cl.
*G11B 7/00*   (2006.01)
(52) U.S. Cl. .................................... 369/44.13
(58) Field of Classification Search .......... None
See application file for complete search history.

(56) References Cited

U.S. PATENT DOCUMENTS

| | | | | |
|---|---|---|---|---|
| 6,822,935 B1* | 11/2004 | Park et al. | ................. | 369/53.22 |
| 7,099,244 B2* | 8/2006 | Nakata et al. | ............... | 369/47.19 |
| 7,447,142 B2* | 11/2008 | Kuroda et al. | ............. | 369/275.4 |
| 7,447,290 B2* | 11/2008 | Hsiao | ........................... | 375/375 |
| 7,693,012 B2* | 4/2010 | Hsieh et al. | ................. | 369/44.13 |
| 2004/0165497 A1* | 8/2004 | Hirayama | .................. | 369/47.31 |
| 2005/0147016 A1 | 7/2005 | Morikawa et al. | | |
| 2006/0007822 A1* | 1/2006 | Mashimo | .................. | 369/47.28 |
| 2006/0077849 A1* | 4/2006 | Chen et al. | ................. | 369/59.17 |

FOREIGN PATENT DOCUMENTS

| | | |
|---|---|---|
| CN | 1673877 A | 7/2005 |
| JP | 2000-113595 | 4/2000 |
| JP | 2005-196846 | 7/2005 |
| JP | 2005-353195 | 12/2005 |
| JP | 2006-059447 | 3/2006 |

OTHER PUBLICATIONS

Japanese Office Action issued on Oct. 20, 2009, for corresponding Japanese Patent Application 2007-322460.

* cited by examiner

*Primary Examiner* — Peter Vincent Agustin
(74) *Attorney, Agent, or Firm* — K&L Gates LLP

(57) ABSTRACT

A wobble signal extraction circuit includes: an RF signal component acquiring portion for acquiring an RF signal component from at least one of first and second signals received by two light receiving portions, the two light receiving portions being obtained through division in halves with a direction along which each track of an optical recording medium extends as a boundary; a wobble signal acquiring portion for acquiring a wobble signal by subtracting the second signal from the first signal; an RF signal component binarizing portion for binarizing the RF signal component; a wobble signal binarizing portion for binarizing the wobble signal; and an exclusive OR arithmetically operating portion for arithmetically operating an exclusive OR of the binarized RF signal component and the binarized wobble signal; wherein balances between amplitudes of the first and second signals are detected based on an arithmetic operation result obtained in the exclusive OR arithmetically operating portion.

8 Claims, 4 Drawing Sheets

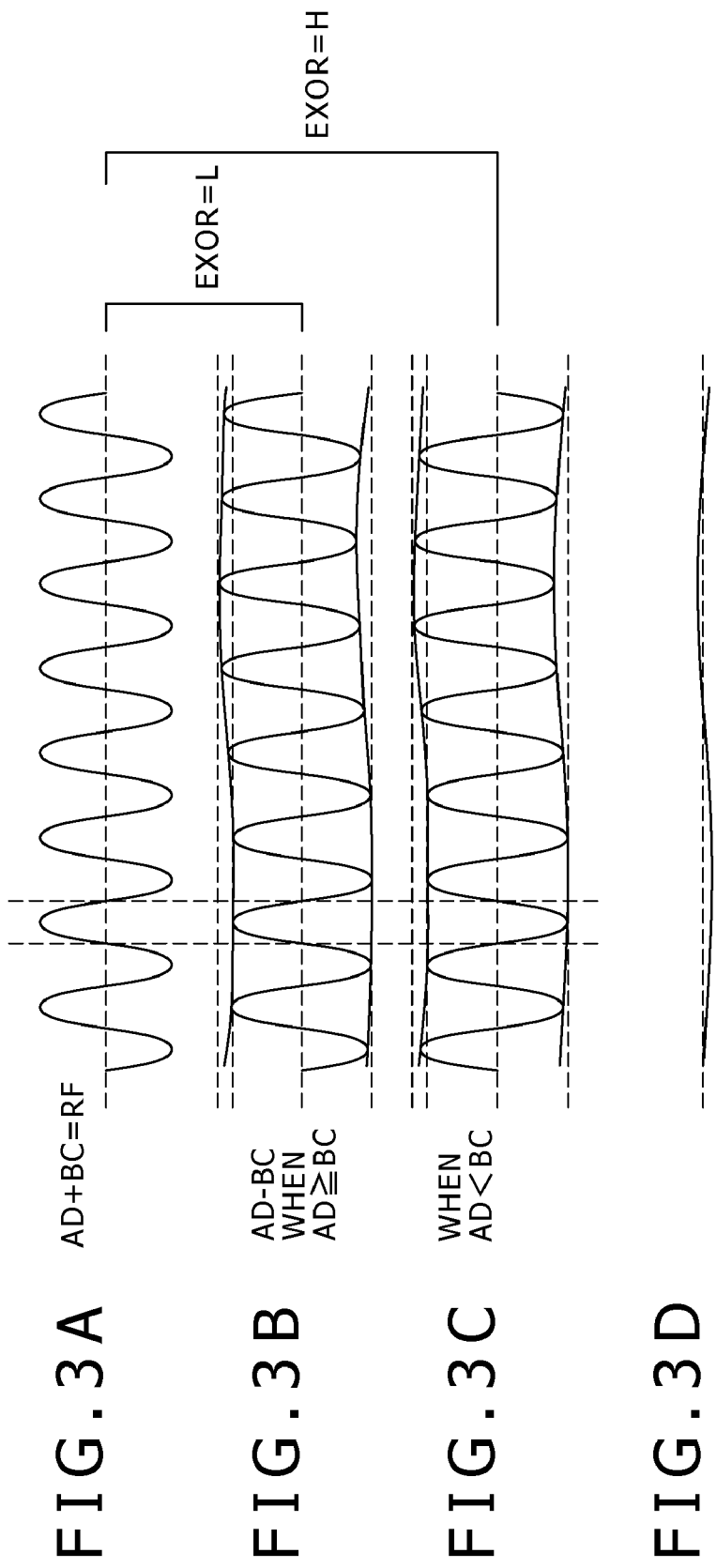

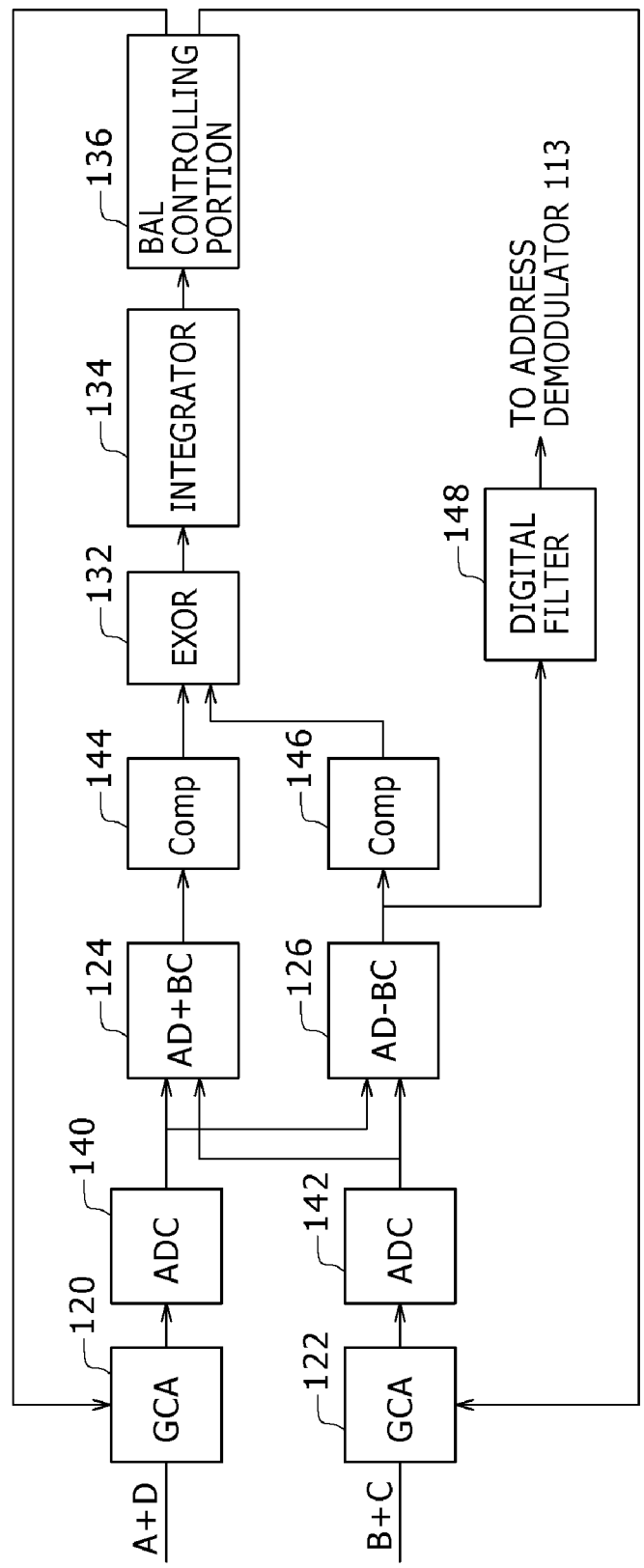

US 7,933,173 B2

WOBBLE SIGNAL EXTRACTION CIRCUIT AND OPTICAL DISK DEVICE

CROSS REFERENCES TO RELATED APPLICATIONS

The present application claims priority to Japanese Patent Application JP 2007-322460 filed in the Japan Patent Office on Dec. 13, 2007, the entire contents of which is being incorporated herein by reference.

BACKGROUND

The present application relates to a wobble signal extraction circuit and an optical disk device including the same.

In general, in a recording optical disk, in order to indicate disk positional information or the like, a wobble signal called a wobble is previously recorded in a groove becoming a track. For example, in the case of a CD-R/RW, a frequency of 22.05 kHz which is sufficiently lower than 4.3218 MHz as a frequency of a basic clocking signal for an RF (Radio Frequency) signal desired to be recorded is used as a basic frequency of the wobble signal. In addition, in the case of a DVD+RW, a frequency of 818 kHz near 26.16 MHz as a frequency of a basic clocking signal for an RF signal is used as a frequency within a frequency band of the wobble signal.

A method of arithmetically operating a push-pull signal component {(A+D)−(B+C)} for signals (A, B, C, D) from light receiving portions which is obtained by dividing a photo detector (PD) in quarters is known as a method of detecting the wobble signal recorded in the optical disk device. In this case, the wobble signal detected is converted into address information by using an address decoder, thereby making it possible to obtain positional information for recording and reproducing. Here, a noise component is hardly contained in an unrecorded portion in which no RF signal is recorded. Therefore, even when there is a gain difference between channels for signals (A+D) and (B+C), this gain difference merely becomes an offset, and thus there is caused no problem in detection of the wobble signal.

In a recorded portion in which the RF signal is already recorded, however, when the gain difference is generated between the channels for the signals (A+D) and (B+C), leakage of the RF signal occurs in a phase of detection of the wobble signal. As a result, there is encountered a problem that the characteristics of the wobble signal is deteriorated.

In order to cope with this situation, Japanese Patent Laid-open No. 2005-353195 discloses a circuit configuration including two variable gain amplifiers, two detectors, a comparator, and a gain controlling section. In this case, the two variable gain amplifiers change output signals (A+D) and (B+C) from a light receiving element divided into halves at arbitrary gains, respectively. The two detectors detect output signals from the two variable gain amplifiers, respectively. The comparator compares output signals from the two detectors with each other. Also, the gain controlling section controls gains of the two variable gain amplifiers based on a comparison output from the comparator. Thus, the circuit configuration forms an Auto Gain Control (AGC) circuit for causing gain balances between the channels for the signals from which a push-pull signal is obtained to agree with each other.

SUMMARY

However, with the technique in the related art, the amplitudes of the signals (A+D) and (B+C) are made to agree with each other by an AGC loop. Thus, the provision of the AGC circuit is absolutely imperative. As a result, there is caused a problem that the circuit configuration becomes complicated. In addition, the two detectors, the comparator, and the like need to be configured in the AGC circuit, and thus there is also caused a problem that the circuit configuration becomes complicated.

In addition, in order to precisely perform those AGC operations, a Gain Control Amplifier (GCA) for adjusting the signal amplitude to some degree, a Low-Pass Filter (LPF) for removing a high-frequency component, and the like need to be configured in a preceding stage of the AGC circuit. For this reason, there is encountered a problem that the circuit is further scaled up.

In the light of the foregoing, it is therefore desirable to provide novel and improved wobble signal extraction circuit and optical disk device each of which is capable of reliably removing an RF signal component from a wobble signal with a simple configuration.

In order to attain the desire described above, according to an embodiment, there is provided a wobble signal extraction circuit, including: an RF signal component acquiring portion for acquiring an RF signal component from at least one of a first signal and a second signal received by two light receiving portions, respectively, the two light receiving portions being obtained through division in halves with a direction along which each track of an optical recording medium extends as a boundary; a wobble signal acquiring portion for acquiring a wobble signal by subtracting the second signal from the first signal; an RF signal component binarizing portion for binarizing the RF signal component; a wobble signal binarizing portion for binarizing the wobble signal; and an exclusive OR arithmetically operating portion for arithmetically operating an exclusive OR of the binarized RF signal component and the binarized wobble signal; in which balances between an amplitude of the first signal and an amplitude of the second signal are detected based on an arithmetic operation result obtained in the exclusive OR arithmetically operating portion.

According to the circuit configuration descried above, the RF signal component is acquired from at least one of the first signal and the second signal detected by the two light receiving portions, respectively, obtained through the division in halves with the direction along which each track of the optical medium extends with the boundary. Also, the wobble signal is acquired by subtracting the second signal from the first signal. The RF signal component and the wobble signal are both binarized, and the exclusive OR of the RF signal component and wobble signal thus binarized is arithmetically operated. Also, the balances between the amplitude of the first signal and the amplitude of the second signal are detected based on the exclusive OR thus arithmetically operated. Therefore, a direction of a deviation of the balances between the amplitude of the first signal and the amplitude of the second signal can be detected by arithmetically operating the exclusive OR of the binarized RF signal component and the binarized wobble signal. As a result, it is possible to unify the balances between the amplitude of the first signal and the amplitude of the second signal. Thus, it is possible to precisely extract the wobble signal.

According to another embodiment, there is provided an optical disk device, including: an optical pickup for radiating a light to a track of an optical recording medium, and receiving a reflected light from the optical recording medium in two light receiving portions obtained through division in halves with a direction along which each track extends as a boundary; an RF signal component acquiring portion for acquiring an RF signal component from at least one of a first signal and a second signal detected by the two light receiving portions, respectively; a wobble signal acquiring portion for acquiring a wobble signal by subtracting the second signal from the first signal; an RF signal component binarizing portion for binarizing the RF signal component; a wobble signal binarizing portion for binarizing the wobble signal; an exclusive OR arithmetically operating portion for arithmetically operating an exclusive OR of the binarized RF signal component and the binarized wobble signal; a wobble signal extraction circuit for adjusting balances between an amplitude of the first signal and an amplitude of the second signal based on an arithmetic operation result obtained in the exclusive OR arithmetically operating portion; and a signal processing portion for recording or reading out data in or from the optical recording medium based on the wobble signal extracted by the wobble signal extraction circuit.

According to the circuit configuration described above, the RF signal component is acquired from at least one of the first signal and the second signal detected by the two light receiving portions, respectively, obtained through the division in halves with the direction along which each track of the optical medium extends with the boundary. Also, the wobble signal is acquired by subtracting the second signal from the first signal. The RF signal component and the wobble signal are both binarized, and the exclusive OR of the RF signal component and wobble signal thus binarized is arithmetically operated. Also, the balances between the amplitude of the first signal and the amplitude of the second signal are detected based on the exclusive OR thus arithmetically operated. Therefore, a direction of a deviation of the balances between the amplitude of the first signal and the amplitude of the second signal can be detected by arithmetically operating the exclusive OR of the binarized RF signal component and the binarized wobble signal. As a result, it is possible to unify the balances between the amplitude of the first signal and the amplitude of the second signal. Thus, it is possible to precisely extract the wobble signal. Moreover, the data can be recorded or read out in or from the optical recording medium with a high degree of precision based on the wobble signal.

According to an embodiment, it is possible to provide the wobble signal extraction circuit and the optical disk device including the same each of which is capable of reliably removing the RF signal component from the wobble signal with the simple configuration.

Additional features and advantages are described herein, and will be apparent from the following Detailed Description and the figures.

BRIEF DESCRIPTION OF THE FIGURES

FIGS. 3A to 3D are respectively characteristic diagrams showing a signal waveform of the full addition signal outputted from the adder, and signal waveforms of the wobble signal outputted from the subtractor or wobble signal after gains are adjusted; and FIG. 4 is a schematic block diagram showing a configuration of the wobble signal extraction circuit according to another embodiment of the present invention.

DETAILED DESCRIPTION

Figure 1:
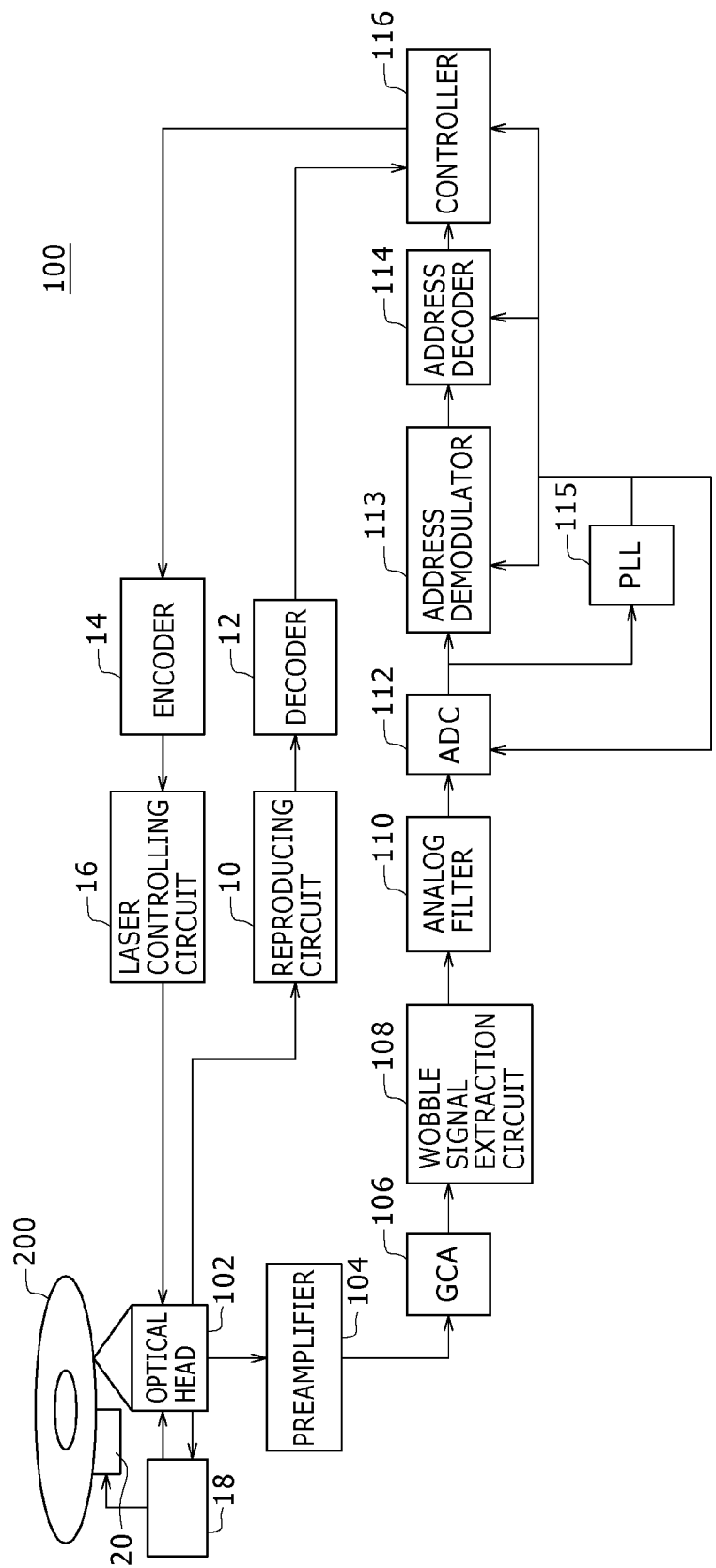
FIG. 1 is a schematic block diagram showing a configuration of an optical disk device according to an embodiment.

An embodiment will be described in detail hereinafter with reference to the accompanying drawings. It is noted that in this specification and the drawings, constituent elements having substantially the same functions and configurations are designated with the same reference numerals, respectively, and a repeated description is omitted here for the sake of simplicity.

FIG. 1 is a schematic block diagram showing a configuration of an optical disk device 100 according to an embodiment of the present invention. The optical disk device 100 includes a wobble signal processing system. The wobble signal processing system is composed of an optical head (optical pickup) 102, a preamplifier 104, a Gain Control Amplifier (GCA) 106, a wobble signal extraction circuit 108, an analog filter 110, an A/D converter (ADC) 112, an address demodulator 113, an address decoder 114, a Phase Locked Loop (PLL) 115, and a controller 116. In this case, the optical head 102 reads out data from a track of a disk-like recording medium 200.

In addition, a reproducing circuit 10 is connected to the optical head 102. Here, the reproducing circuit 10 executes processing such as filtering, digitization and the like of a regenerative signal detected from the disk-like recording medium 200. Also, a decoder 12 for converting a data format into another one is connected to the reproducing circuit 10. In such a manner, a signal reproducing system is configured.

In addition, information to be recorded is sent from the controller 116 to the encoder 14. The encoder 14 converts a data format of the information to be recorded into another one. Also, a laser controlling circuit 16 controls light emission of a light source provided within the optical head 102 in correspondence to information bit, thereby writing the information to be recorded in the disk-like recording medium 200. In such a manner, a signal recording system is configured.

In addition, a servo signal is generated from an output signal detected by a light receiving element in the optical head 102. Thus, a servo circuit 18 controls a position of the optical head 102 in accordance with the servo signal thus generated. In addition, the servo circuit 18 controls rotation of a spindle motor 20 equipped with the disk-like recording medium 200.

An optical disk having tracks which are formed on an recording surface through wobbling is used as the disk-like recording medium 200. The optical head 102 is composed of a light source such as a laser diode, an objective lens, the light receiving element, an optical system, an actuator, and the like. In this case, the objective lens condenses a laser beam emitted from the light source such as the laser disk. The light receiving element receives a reflected light from the disk-like optical recording medium 200. The optical system guides the reflected light to the light receiving element. Also, the actuator carries out focusing servo and tracking servo.

In the wobble signal processing system, a signal which is outputted from the optical head 102 and is amplified in the preamplifier 104 is adjusted in an amplitude thereof in the GCA 106 so as to meet a D range in a subsequent stage circuit. Also, a wobble signal is extracted from the output signal from the GCA 106 in the wobble signal extraction circuit 108, and the resulting signal is then inputted to the analog filter 110. An unnecessary signal component having a low frequency, and an unnecessary signal component having a high frequency are both removed from the input signal in the analog filter 110. A regenerative signal (wobble signal) obtained by removing the unnecessary signal components from the input signal in the analog filter 110 is inputted to the A/D conversion circuit 112. An output signal from the A/D conversion circuit 112 is inputted to the address demodulator 113. The address demodulator 113 carries out address demodulation by detecting a modulated signal obtained by modulating the wobble signal inputted thereto, and outputs the resulting signal to the address decoder 114 in the subsequent stage. The address decoder 114 decodes an address from the demodulated data, reproduces address information on an access position, and outputs the address information thus reproduced to the controller 106. The controller 116 controls the signal reproducing system and the signal recording system of the optical disk device 100 in accordance with the address information inputted thereto. The PLL 115 has a function of generating a clocking signal which is used in the A/D conversion circuit 112, the address demodulator 113, the address decoder 114, and the controller 116.

Figure 2:
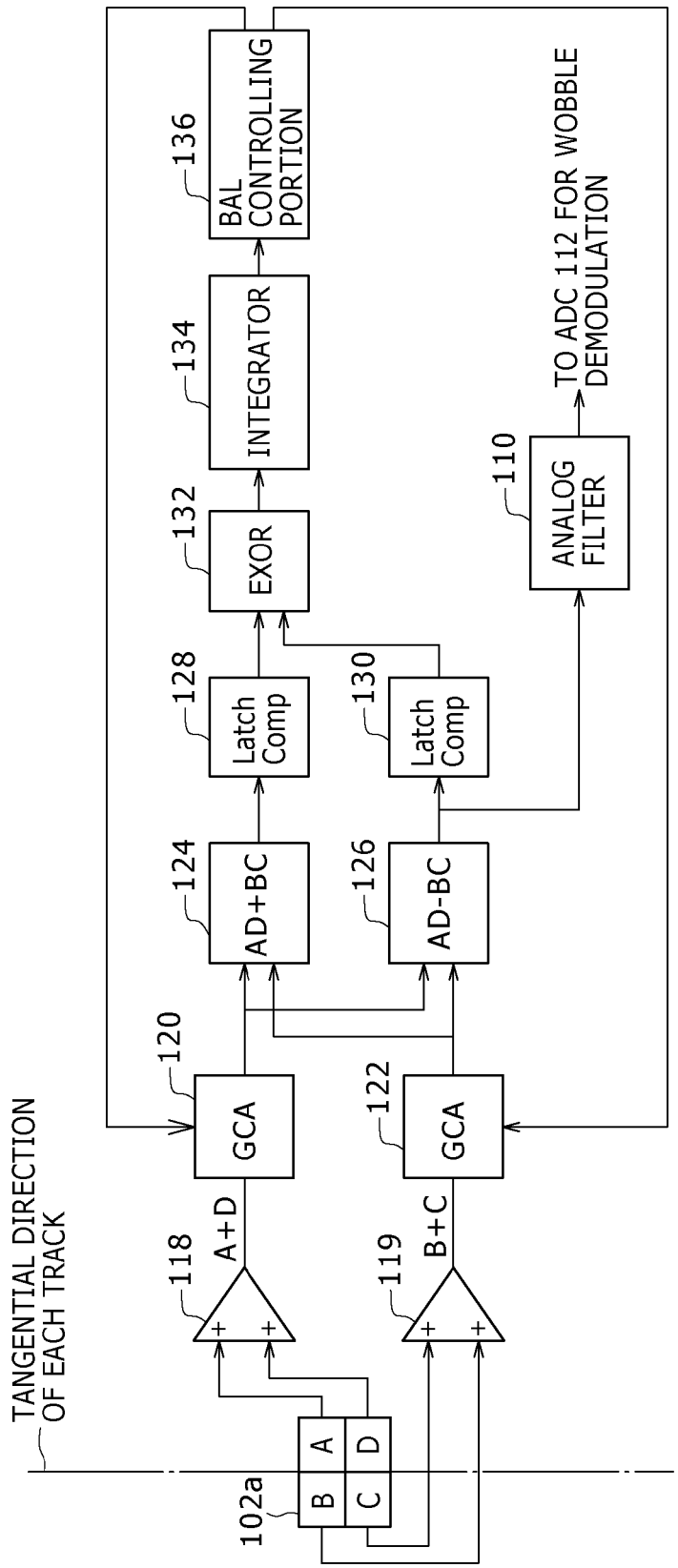
FIG. 2 is a schematic block diagram showing a configuration of a wobble signal extraction circuit according to an embodiment of the present invention, and also showing peripheral circuits thereof, the wobble signal extraction circuit and the peripheral circuits thereof being included in the optical disk device shown in FIG. 1.

FIG. 2 is a schematic block diagram, partly in circuit, showing a configuration of the wobble signal extraction circuit 108 and peripheral circuits, each included in the optical disk device 100 shown in FIG. 1. In general, a format in which a track is wobbled in order to precisely detect a linear speed in each of radial positions is adopted in the recording system media such as the optical disk in many cases. The optical disk device 100 can access an arbitrary position in an unrecorded disk and can also record or reproduce information in or from such a disk by reading out these wobble signals.

As shown in FIG. 2, the optical head 102 is divided in a light receiving region thereof into halves with respect to a direction along which each track extends (a tangential direction of each track). Thus, the optical head 102 receives a reflected light of a light spot from a recording surface. A Photo Detector (PD) which is divided in quarters for the purpose of receiving a reflected light of a main spot is used as the light receiving element 102a. As shown in FIG. 2, light receiving portions A and D as one of the light receiving regions obtained through division in halves with respect to a tangential direction of each track are disposed on one side of the light receiving element 102a. On the other hand, light receiving portions B and C as the other of the light receiving regions obtained through the division in halves are disposed on the other side of the light receiving element 102a. Output signals from the light receiving portions A and D are inputted to an adder 118, and the adder 118 outputs a signal (A+D) obtained through the addition processing. On the other hand, output signals from the light receiving portions B and C are inputted to an adder 119, and the adder 119 outputs a signal (B+C) obtained through the addition processing. The wobble signal is obtained by detecting a push-pull signal component {(A+D)−(B+C)} of the main beam. It is noted that the signal (A+D) is spelled as AD, and the signal (B+C) is spelled as BC in the figure as may be necessary.

As shown in FIG. 2, the wobble signal extraction circuit 108 is composed of Gain Control Amplifiers (GCAs) 120 and 122, an adder 124, a subtractor 126, latch comparators 128 and 130, an exclusive OR (EXOR) circuit 132, an integrator 134, and a balance (BAL) controlling portion 136.

As shown in FIG. 2, the signal (A+D) is inputted to the GCA 120, thereby adjusting a gain thereof. In addition, the signal (B+C) is inputted to the GCA 122, thereby adjusting a gain thereof. The signal (A+D) having the adjusted gain, and the signal (B+C) having the adjusted gain are inputted to the adder 124 and the supracter 126, respectively.

The adder 124 adds the signal (A+D) and the signal (B+C) to each other, and outputs a full addition signal R (=A+B+C+D). On the other hand, the subtractor 126 subtracts the signal (B+C) from the signal (A+D), and outputs a push-pull signal {(A+D)−(B+C)} as the wobble signal.

The full addition signal R (=A+B+C+D) is inputted to the latch comparator 128. The latch comparator 128 is an analog comparator for binarizing the AC component of the input signal in accordance with a result of comparison of the input signal with a predetermined value.

On the other hand, the wobble signal {(A+D)−(B+C)} is inputted to the latch comparator 130. The latch comparator 130 is an analog comparator for binarizing the input signal in accordance with a result of comparison of the input signal with a predetermined value.

Output signals from the latch comparators 128 and 130 are both inputted to the EXOR circuit 132. The EXOR circuit 132 arithmetically operates an exclusive OR (EXOR) of the two input signals binarized. Therefore, the EXOR 132 outputs a signal having a low (L) level when the full addition signal (A+B+C+D) and the wobble signal {(A+D)−(B+C)} are in phase with each other, while it outputs a signal having a high (H) level when the full addition signal (A+B+C+D) and the wobble signal {(A+D)−(B+C)} are out of phase with each other.

An output signal (binary signal) from the EXOR circuit 132 is inputted to the integrator 134. The integrator 134 arithmetically operates a value of integral of the binary signal inputted from the EXOR circuit 132.

An output signal from the integrator 134 is inputted to the BAL controlling portion 136. The BAL controlling portion 136 outputs gain balance control signals, in accordance with which the gains of the GCAa 120 and 122 are adjusted, respectively, based on the output signal from the integrator 134. The gain balance control signals outputted from the BAL controlling portion 136 are inputted to the GCA 120 and the GCA 122, respectively, thereby configuring a feedback loop for adjusting the gains of the GCAs 120 and 122. Each of the GCAs 120 and 122 is a circuit for adjusting a gain in correspondence to a digital code input, and thus the GCAs 120 and 122 carry out feedback control for the gains thereof in accordance with the gain balance control signals sent thereto from the BAL controlling portion 136.

The gain balance control signals which are inversed to each other are outputted from the BAL controlling portion 136 to the GCAs 120 and 122, respectively. Also, a sum of the gains of the GCAs 120 and 122 each of which is controlled by the BAL controlling portion 136 is held at a constant value. That is to say, the gain balance controlling signal in accordance with which the gain is increased is outputted to one of the GCAs 120 and 122, and the gain balance controlling signal in accordance with which the gain is decreased is outputted to the other of the GCAs 120 and 122.

FIGS. 3A to 3D are respectively characteristic diagrams showing a signal waveform of the full addition signal outputted from the adder 124, a signal waveform of the wobble signal outputted from the subtractor 126, a signal waveform of the wobble signal outputted from the subtractor 126, and the wobble signal after gains are adjusted. Here, FIG. 3A shows the signal waveform of the full addition signal outputted from the adder 124. The signal (A+D) and the signal (B+C) contain therein components of the RF signal (recording signal) which are in phase with each other, respectively. Therefore, the full addition signal obtained by adding the signal (A+D) and the signal (B+C) to each other becomes a signal which is in phase with the original RF signal which each of the signal (A+D) and the signal (B+C) has. It is noted that although the RF signal components are acquired by adding the signal (A+D) and the signal (B+C) to each other herein, it is possible to acquire the RF signal components either from one of the signal (A+D) and the signal (B+C), or from any one of the signals A, B, C, and D.

FIGS. 3B and 3C respectively show the signal waveforms of the wobble signals each outputted from the subtractor 126, and thus show the case where amplitudes of the signal (A+D) and the signal (B+C) are different from each other. That is to say, FIG. 3B shows the case where the relationship of the amplitude of the signal (A+D)≧the amplitude of the signal (B+C) is established, and FIG. 3C shows the case where the relationship of the amplitude of the signal (A+D)<the amplitude of the signal (B+C) is established. In such a manner, the signal (A+D) and the signal (B+C) contain therein the RF signal components in phase with each other, respectively. Thus, when a magnitude correlation occurs between the signal (A+D) and the signal (B+C) due to a deviation of the balances of the amplitude of the signal (A+D) and the amplitude of the signal (B+C), the RF signal component which is in phase with or out of phase with the RF signal leaks into the wobble signal depending on how to deviate the balances between the amplitudes. In addition, FIG. 3D shows the wobble signal after the gains are adjusted in the GCAs 120 and 122, respectively, so that the amplitude of the signal (A+D) becomes identical to that of the signal (B+C).

When the relationship of the amplitude of the signal (A+D) ≧the amplitude of the signal (B+C) is established as shown in FIGS. 3A and 3B, the RF signal component in phase with the full addition signal leaks into the wobble signal, so that the full addition signal becomes in phase with the wobble signal. In this case, the output signal from the latch comparator 128 becomes in phase with the output signal from the latch comparator 130, so that the output signal from the EXOR circuit 132 has a low (L) level.

On the other hand, when the relationship of the amplitude of the signal (A+D)<the amplitude of the signal (B+C) is established as shown in FIGS. 3A and 3C, the RF signal component out of phase with the full addition signal leaks into the wobble signal, so that the full addition signal becomes out of phase with the wobble signal. In this case, since the output signal from the latch comparator 128 is out of phase with the output signal from the latch comparator 130, the output signal from the EXOR circuit 132 has a high (H) level.

Therefore, it is possible to determine the balances (magnitude correlation) between the amplitude of the signal (A+D) and the amplitude of the signal (B+C) based on the output signal from the EXOR circuit 132. Thus, it is possible to determine the direction of the deviation of the balances between them. Also, when the magnitude correlation between the amplitude of the signal (A+D) and the amplitude of the signal (B+C) is made clear, the feedback is made in a direction of eliminating the magnitude correlation, thereby making it possible to unify the balances between the amplitude of the signal (A+D) and the amplitude of the signal (B+C). Specifically, the gains of the GCAs 120 and 122 are made variable based on the magnitude correlation between the amplitude of the signal (A+D) and the amplitude of the signal (B+C), which results in that the amplitude of the signal (A+D) and the amplitude of the signal (B+C) can be controlled at the equal level. Also, the balances between the amplitude of the signal (A+D) and the amplitude of the signal (B+C) are held as they are, which results in that an average value of the RF signal component of the wobble signal {(A+D)−(B+C)} can be controlled at zero. Thus, as shown in FIG. 3D, it is possible to reliably remove the RF signal component from the wobble signal.

The output signal from the EXOR circuit 132 is inputted to the integrator 134, and is integrated in the integrator 134 for a certain time period. When the output signal, having the low (L) level, outputted from the EXOR circuit 132 is integrated in the integrator 134, the relationship of the amplitude of the signal (A+D)≧the amplitude of the signal (B+C) is established. Thus, the BAL controlling portion 136 outputs the gain balance control signal in accordance with which the gain is reduced in the GCA 120 to which the signal (A+D) is inputted based on the output signal from the integrator 134. On the other hand, the BAL controlling portion 136 outputs the gain balance control signal in accordance with which the gain is increased in the GCA 122 to which the signal (B+C) is inputted based on the output signal from the integrator 134.

On the other hand, when the output signal, having the high (H) level, outputted from the EXOR circuit 132 is integrated in the integrator 134, the relationship of the amplitude of the signal (A+D)<the amplitude of the signal (B+C) is established. Thus, the BAL controlling portion 136 outputs the gain balance control signal in accordance with which the gain is increased in the GCA 120 based on the output signal from the integrator 134. On the other hand, the BAL controlling portion 136 outputs the gain balance control signal in accordance with which the gain is decreased in the GCA 122 based on the output signal from the integrator 134.

As described above, the BAL controlling portion 136 outputs the gain balance control signals, having the binary codes, which are inverted to each other to the GCAs 120 and 122, respectively. Therefore, the gains are adjusted in a direction along which the amplitude of the signal (A+D) and the amplitude of the signal (B+C) approach each other in the GCAs 120 and 122, respectively. As a result, the amplitude of the signal (A+D) and the amplitude of the signal (B+C) can be controlled at the same level.

The wobble signal which is feedback-controlled in the manner as described above is inputted from the subtractor 126 to the analog filter 110, and is then inputted to the A/D conversion circuit 112 for wobble demodulation. Since in this embodiment, the magnitude correlation between the amplitude of the signal (A+D) and the amplitude of the signal (B+C) is judged based on the wobble signal, the RF signal component of the wobble signal can be removed in accordance with the judgment result using the wobble signal itself. Therefore, the RF signal component can be reliably removed from the wobble signal as compared with the case where the wobble signal is processed based on any other characteristic value. As a result, the wobble signal can be set in the most satisfactory state.

With regard to the frequency component of the RF signal leaking into the wobble signal, the frequency component having a frequency near a frequency band of the wobble signal especially becomes a problem. For this reason, for example, the RF signal component having a low frequency which is outside the frequency band of the wobble signal may be previously removed by the filter, and the EXOR processing may be executed based on the RF signal component having a low frequency near the frequency band of the wobble signal, thereby adjusting the gain. In this case, for example, filters for cutting signal components having high frequency bands, respectively, are provided in a preceding stage of the adder, and in a preceding stage of the subtractor, respectively. In addition thereto, filters may be provided in preceding stages of the latch comparators 128 and 130, respectively. A frequency which is cut by the filter may be suitably selected based on the frequency band of the wobble signal.

It is noted that although the BAL controlling portion 136 outputs the gain balance control signals to the GCA 120 and the GCA 122, respectively, the BAL controlling portion 136 may output the gain balance control signal only to one of the GCA 120 and the GCA 122 instead, thereby adjusting the gain only for one of the signal (A+D) and the signal (B+C). In this case as well, the feedback control can be carried out so that the amplitude of the signal (A+D) and the amplitude of the signal (B+C) have the equal level. It is noted that in this case, the sum of the gains of the GCAs 120 and 122 is not a constant value, and thus one of the gains of the GCAs 120 and 122 can be made a fixed value. However, the amplitude fluctuation in the feedback control can be made less in the case where the gain balance control signals are inputted to the GCA 120 and the GCA 122, respectively, so that the GCA 120 and the GCA 122 are differentially operated than in any other case.

FIG. 4 is a schematic block diagram showing the wobble signal extraction circuit 108 according to another embodiment of the present invention. In the wobble signal extraction circuit 108 shown in FIG. 4, an A/D conversion circuit 140 is provided in a preceding stage of the adder 124, and an A/D conversion circuit 142 is provided in a preceding stage of the subtractor 126. In addition, comparators 144 and 146 for binarizing digital signals are provided instead of providing the latch comparators 128 and 130, respectively. In the wobble signal extraction circuit shown in FIG. 2, both the adder 124 and the subtractor 126 are provided in the analog region, and the latch comparators 128 and 130 each execute the processing for binarizing the analog signal. However, in the wobble signal extraction circuit shown in FIG. 4, after the A/D conversion circuit 140 binarizes the signal (A+D), and the A/D conversion circuit 142 binarizes the signal (B+C), the same processing as that in FIG. 2 is executed in the digital arithmetic operation.

According to the wobble signal extraction circuit 108 shown in FIG. 4, the gains of the GCA 120 and the GCA 122 can be both adjusted in the digital arithmetic operation. Also, after the wobble signal outputted from the subtractor 126 is filtered by a digital filter 148, the resulting signal is inputted to the address demodulator 113. It is to be noted that when each of the GCA 120 and the GCA 122 has the sufficient resolution capability, the GCA 120 and the GCA 122 may be disposed in the subsequent stages of the A/D conversion circuit 140 and the A/D conversion circuit 142, respectively. In this case, after the analog signal (A+D) and the analog signal (B+C) are converted into the digital signals in the A/D conversion circuit 140 and the A/D conversion circuit 142, respectively, the gain balances can be adjusted in the GCA 120 and the GCA 122, respectively.

As set forth hereinabove, according to an embodiment, the exclusive OR of the binarized RF signal component (full addition signal) and the binarized wobble signal is arithmetically operated, thereby making it possible to detect the direction of the deviation of the balances between the amplitude of the signal (A+D) and the amplitude of the signal (B+C). Therefore, the balances between the amplitude of the signal (A+D) and the amplitude of the signal (B+C) can be unified by carrying out the feedback control based on the detection result, which results in that it is possible to precisely extract the wobble signal. In addition, it is unnecessary to provide the AGC loop for the purpose of adjusting the balances between the amplitude of the signal (A+D) and the amplitude of the signal (B+C). As a result, it is possible to greatly scale down the balance controlling circuit, and thus it is possible to reduce the manufacturing cost.

In addition, the balance control can be carried out with the output signals from the latch comparators 128 and 130 for binarizing the full addition signal and the wobble signal, respectively. As a result, it is also unnecessary to provide the GCA for adjustment to the D range of the AGC circuit, the LPF for shaping the waveform of the RF signal, and the like. In addition, heretofore, in order to adjust the absolute amplitudes of the signals in the AGC circuit, it is necessary to obtain both the large D range and the gain range. However, according to the embodiments of the present invention, it is possible to minimize the gain range of the gain controlling circuit because only the balances between the amplitude of the signal (A+D) and the amplitude of the signal (B+C) have to be controlled.

Moreover, the balance detection after the binarization, and the signal processing for the balance control can be all carried out logically. Therefore, the circuit can be scaled down as compared with the case of the analog signal processing, and thus it is possible to obtain the excellent compatibility with the CMOS system LSI. In addition, the comparator circuit is readily made offset-free in the CMOS process. Thus, from this respect as well, there is obtained the excellent compatibility with the CMOS process. Moreover, since the deviation of the balances is detected from the residual RF signal component obtained after the wobble signal is extracted, the balances can be controlled so that the residual RF signal component becomes minimum. As a result, it is possible to improve the quality of the wobble signal.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wobble signal extraction circuit, comprising:
   a radio-frequency signal component acquiring portion configured to acquire a radio-frequency signal component from at least one of a first signal and a second signal received by two light receiving portions, respectively, said two light receiving portions being obtained through division in halves with a direction along which each track of an optical recording medium extends as a boundary;
   a wobble signal acquiring portion configured to acquire a wobble signal by subtracting the second signal from the first signal;
   a radio-frequency signal component binarizing portion configured to binarize the radio-frequency signal component;
   a wobble signal binarizing portion configured to binarize the wobble signal; and
   an exclusive OR arithmetically operating portion configured to arithmetically operate an exclusive OR of the binarized radio-frequency signal component and the binarized wobble signal;
   wherein balances between an amplitude of the first signal and an amplitude of the second signal are detected based on an arithmetic operation result obtained in said exclusive OR arithmetically operating portion.

2. The wobble signal extraction circuit according to claim 1, wherein said radio-frequency signal component acquiring portion acquires the radio-frequency signal component by adding the first signal and the second signal to each other.

3. The wobble signal extraction circuit according to claim 1, further comprising:
   a first gain adjusting portion configured to adjust a gain for the first signal based on the arithmetic operation result obtained in said exclusive OR arithmetically operating portion; and a second gain adjusting portion configured to adjust a gain for the second signal based on the arithmetic operation result obtained in said exclusive OR arithmetically operating portion.

4. The wobble signal extraction circuit according to claim 3, further comprising
an integrator configured to integrate an output signal from said exclusive OR arithmetically operating portion,
wherein said first and second gain adjusting portions adjust the gains for the first and second signals, respectively, based on the integrated exclusive OR.

5. The wobble signal extraction circuit according to claim 1, further comprising
a filter for removing an unnecessary frequency component depending on a frequency band of the wobble signal, said filter being provided in a preceding stage of either said radio-frequency signal component binarizing portion or said wobble signal binarizing portion.

6. The wobble signal extraction circuit according to claim 1, further comprising
analog-to-digital conversion circuits for converting the first and second signals into respective digital signals,
wherein balances between an amplitude of the first signal and an amplitude of the second signal are detected in digital signal processing.

7. An optical disk device, comprising:
an optical pickup for radiating a light to a track of an optical recording medium, and receiving a reflected light from said optical recording medium in two light receiving portions obtained through division in halves with a direction along which each track extends as a boundary;
a radio-frequency signal component acquiring portion configured to acquire a radio-frequency signal component from at least one of a first signal and a second signal detected by said two light receiving portions, respectively;
a wobble signal acquiring portion configured to acquire a wobble signal by subtracting the second signal from the first signal;
a radio-frequency signal component binarizing portion configured to binarize the radio-frequency signal component;
a wobble signal binarizing portion configured to binarize the wobble signal;
an exclusive OR arithmetically operating portion configured to arithmetically operate an exclusive OR of the binarized radio-frequency signal component and the binarized wobble signal;
a wobble signal extraction circuit configured to adjust balances between an amplitude of the first signal and an amplitude of the second signal based on an arithmetic operation result obtained in said exclusive OR arithmetically operating portion; and
a signal processing portion configured to record or read out data in or from said optical recording medium based on the wobble signal extracted by said wobble signal extraction circuit.

8. A wobble signal extraction circuit, comprising:
radio-frequency signal component acquiring means for acquiring a radio-frequency signal component from at least one of a first signal and a second signal received by two light receiving portions, respectively, said two light receiving portions being obtained through division in halves with a direction along which each track of an optical recording medium extends as a boundary;
wobble signal acquiring means for acquiring a wobble signal by subtracting the second signal from the first signal;
radio-frequency signal component binarizing means for binarizing the radio-frequency signal component;
wobble signal binarizing means for binarizing the wobble signal; and
exclusive OR arithmetically operating means for arithmetically operating an exclusive OR of the binarized radio-frequency signal component and the binarized wobble signal;
wherein balances between an amplitude of the first signal and an amplitude of the second signal are detected based on an arithmetic operation result obtained in said exclusive OR arithmetically operating means.

* * * * *